United States Patent [19]

Loch et al.

[11] Patent Number: 4,699,937
[45] Date of Patent: Oct. 13, 1987

[54] SYNTHETIC RESIN CARRYING BASIC NITROGEN GROUPS, ITS PREPARATION, COATING MATERIALS PRODUCED USING THIS RESIN, AND CATHODIC ELECTROCOATING

[75] Inventors: Werner Loch, Erpolzheim; Eberhard Schupp, Schwetzingen; Rolf Osterloh, Gruenstadt; Klaas Ahlers, Muenster, all of Fed. Rep. of Germany

[73] Assignee: BASF Farben+Fasern Aktiengesellschaft, Hamburg, Fed. Rep. of Germany

[21] Appl. No.: 808,281

[22] Filed: Dec. 12, 1985

[51] Int. Cl.$^4$ ............................................. C08G 59/46
[52] U.S. Cl. ................................. 523/415; 204/181.7; 523/416; 523/417; 528/111; 528/121; 528/122
[58] Field of Search ...................... 528/111, 121, 122; 525/504; 523/415, 416, 417

[56] References Cited

U.S. PATENT DOCUMENTS

| 3,378,600 | 4/1968 | Hodges | 528/121 |
| 3,547,886 | 12/1970 | Gardner | 528/121 |
| 4,170,579 | 10/1979 | Bosso | 523/415 |
| 4,391,958 | 7/1983 | Minato | 528/122 |
| 4,420,574 | 12/1983 | Moriarity | 523/415 |
| 4,515,911 | 5/1985 | Swider | 523/416 |
| 4,557,814 | 12/1985 | Schupp | 528/121 |
| 4,576,979 | 3/1986 | Schupp | 523/417 |

FOREIGN PATENT DOCUMENTS 0040867 2/1983 European Pat. Off. .
1569391 11/1980 United Kingdom .

Primary Examiner—Paul R. Michl
Attorney, Agent, or Firm—Keil & Weinkauf

[57] ABSTRACT

A synthetic resin carrying basic nitrogen groups, its preparation, coating materials prepared from this resin, and a process for cathodic electrocoating.

This synthetic resin is obtained by reacting (A) an epoxy resin which
(B) a diketimine of a diprimary amine and, if required, (C) with a secondary amine, which may additionally contain a tertiary amino group, with a ketimine of a primary monoamine and/or with a ketimine of a primary/tertiary diamine, a diketimine obtained from (B$_1$) a ketone and
(B$_2$) a branched aliphatic diprimary diamine of 5 to 9 carbon atoms and/or
(B$_3$) one or more diaminodiamides which are obtained by condensation of 2 moles of diamine (B$_2$) and 1 mole of a dicarboxylic acid being employed as component (B).

After protonation with an acid, this synthetic resin is useful as a binder for cathodic electrocoating.

18 Claims, No Drawings

SYNTHETIC RESIN CARRYING BASIC NITROGEN GROUPS, ITS PREPARATION, COATING MATERIALS PRODUCED USING THIS RESIN, AND CATHODIC ELECTROCOATING

The present invention relates to synthetic resins which carry basic nitrogen groups and are water-dilutable on protonation with an acid, the preparation of these resins, and coating materials produced using them, particularly for cathodic electrocoating.

German Patent Application No. P 33 25 061.8 proposes a resin which carries basic nitrogen groups, is water-dilutable on protonation with an acid and is obtainable by reacting (A) one or more epoxy resins having a mean molecular weight $M_n$ of from 300 to 6000 and on average from 1.5 to 3.0 epoxide groups per molecule with
(B) a diketimine of a diprimary amine
and, if required,
(C) with a secondary amine, which may or may not additionally contain a tertiary amino group, with, among others, a ketimine of a primary monoamine.

The number of epoxide equivalents of epoxy resin (A) which are employed is preferably from 50 to 100% of the sum of the number of ketimine and secondary amine equivalents of components (B) and (C) employed.

It is an object of the present invention to provide a synthetic resin which carries basic nitrogen groups, is water-dilutable on protonation with an acid, has improved flow characteristics, gives more stable dispersions after protonation and dilution with water, and, when used as a binder for cathodic electrocoating finishes, provides films possessing improved levelling properties.

Surprisingly, we have found that synthetic resins carrying basic nitrogen groups and having substantially improved properties are obtained if diketimines of specific diamines are used as component (B). The resulting synthetic resins possess more advantageous flow characteristics and greater stability in dispersions and give cathodic electrocoating films exhibiting better leveling properties.

The present invention relates to a synthetic resin which carries basic nitrogen groups, is obtainable by reacting (A) one or more epoxy resins having a mean molecular weight $M_n$ of from 300 to 6000 and on average from 1.5 to 3.0 epoxide groups per molecule with
(B) a diketimine of a diprimary amine
and, if required,
(C) with a secondary amine, which may or may not additionally contain a tertiary amino group, with a ketimine of a primary monoamine or with a ketimine secondary amine and a ketimine of a primary monoamine, with a mixture of a secondary amine and a ketimine of a primary/tertiary diamine, with a mixture of a ketimine of a primary monoamine and a ketimine of a primary/tertiary diamine or with a mixture of a secondary amine, a ketimine of a primary monoamine and a ketimine of a primary/tertiary diamine, and is water-dilutable after protonation with an acid, wherein component (B) is a diketimine obtained from
($B_1$) a ketone and
($B_2$) one or more branched aliphatic diprimary diamines of 5 to 9 carbon atoms, which, if required, may be replaced with as much as 20 per cent by weight of other aliphatic, araliphatic or cycloaliphatic diprimary diamines, and some or all of the diamine ($B_2$) may be replaced with
($B_3$) one or more diaminodiamides which are obtainable by condensation of 2 moles of a diamine ($B_2$) and 1 mole of a dicarboxylic acid having a molecular weight of from 118 to 1000.

The present invention furthermore relates to a synthetic resin of this type which carries basic nitrogen groups and is water-dilutable on protonation with an acid and some or all of whose hydroxyl groups have been converted to urethane groups with partially blocked polyisocyanate.

The present invention furthermore relates to a process for the preparation of a novel synthetic resin, wherein the number of epoxide equivalents of epoxy resin (A) which are used is from 50 to 100% of the sum of the number of ketimine and secondary amine equivalents of component (B) and (C), and, as component (B), a diketimine is used which is obtained when 1 mole of ketone ($B_1$) is used per mole of primary amino groups of the mixture of the diamine components ($B_2$) and ($B_3$) in the ketiminization.

The present invention furthermore relates to a process for the preparation of a coating material, wherein the synthetic resin rendered water-dilutable by protonation with an acid is used in the form of an aqueous dispersion, which may additionally contain crosslinking agents, organic solvents, pigments and/or further assistants, in particular for the cathodic electrocoating of electrically conductive substrates.

The present invention furthermore relates to coating materials which contain, as the binder, the synthetic resin which carries basic nitrogen groups and is prepared according to the invention, and additionally contain a crosslinking agent.

The present invention also relates to articles which are provided with coatings and are obtained by applying the synthetic resins or coating materials prepared according to the invention and carrying out baking.

Regarding the components of the novel synthetic resin and its preparation, the following may be stated specifically:

(A) The epoxy resins (A) used may be any materials provided that they have a mean molecular weight $\overline{M}_n$ of from 300 to 6000 and on average from 1.5 to 3.0 epoxide groups per molecule, preferably compounds having two epoxide groups per molecule. Preferred epoxy resins have mean molecular weights $\overline{M}_n$ of from 350 to 5000, in particular from 350 to 2000. Examples of particularly preferred epoxy resins are glycidyl ethers of polyphenols containing on average two or more phenolic hydroxyl groups per molecule, which are prepared in a conventional manner by etherification with an epihalohydrin in the presence of an alkali. Examples of suitable phenol compounds are 2,2-bis(4-hydroxyphenyl)-propane, 4,4'-dihydroxybenzophenone, 1,1-bis-(4-hydroxyphenyl)-ethane, 1,1-bis-(4-hydroxyphenyl)-isobutane, 2,2-bis-(4-hydroxy-tert.-butylphenyl)-propane, bis-(2-hydroxynaphthyl)-methane and 1,5-dihydroxynaphthalene. In some cases, it is desirable to use aromatic epoxy resins having a higher molecular weight. These are obtained by reacting one of the above diglycidyl ethers with a polyphenol, eg. 2,2-bis-(4-hydroxyphenyl)-propane, and then reacting the resulting product further with epichlorohydrin to prepare a polyglycidyl ether.

Another suitable class of epoxy resins comprises polyglycidyl ethers of phenolic novolak resins.

Polyglycidyl ethers of polyhydric alcohols, such as ethylene glycol, diethylene glycol, triethylene glycol, 1,2-propylene glycol, propane-1,3-diol, pentane-1,5-diol, hexane-1,2,6-triol, glycerol and 2,2-bis-(4-hydroxycyclo-hexyl)-propane, are also useful.

Polyglycidyl esters of polycarboxylic acids may also be used.

Among the preferred polyglycidyl ethers of polyphenols, those having an epoxide equivalent weight of from 180 to 1000 are particularly preferred.

Aromatic polyepoxides having a fairly high epoxide equivalent weight can be prepared from one having a lower epoxide equivalent weight and a polyphenol either before or during the reaction with components (B) and (C).

(B) Component (B) is a diketimine obtained from
 ($B_1$) any ketone and
 ($B_2$) one or more branched aliphatic primary diamines of 5 to 9 carbon atoms, which may, if required, be replaced by as much as 20% by weight of other aliphatic, araliphatic or cycloaliphatic diprimary diamines, and/or
 ($B_3$) one or more diaminodiamides which are obtained by condensation of 2 moles of the diamine ($B_2$) and 1 mole of a dicarboxylic acid having a molecular weight of from 118 to 1000.

($B_1$) Component ($B_1$) is any ketone, eg. acetone, methyl ethyl ketone, methyl propyl ketone, methyl isopropyl ketone, methyl isobutyl ketone, methyl isoamyl ketone, diethyl ketone, dipropyl ketone or cyclohexanone. Preferred ketones are acetone, methyl ethyl ketone and cyclohexanone, but in particular methyl isobutyl ketone.

($B_2$) Component ($B_2$) is a branched aliphatic primary diamine of 5 to 9, preferably 5 or 6, carbon atoms. Examples of suitable diamines are neopentanediamine, 2-ethylpropanediamine, 2-methylbutanediamine, 2-ethylbutanediamine, 2-methylpentanediamine, 2-ethylpentanediamine, 3-methylpentanediamine, 3-ethylpentanediamine, 2,2,4-trimethylhexanediamine, 2,4,4-trimethylhexanediamine and the like. Preferred branched aliphatic primary diamines ($B_2$) used according to the invention are those whose primary amino groups are separated by a branched divalent aliphatic radical which possesses an odd number of carbon atoms in the main chain, eg. neopentanediamine, 2-ethylpropanediamine, 2-methylpentanediamine, 2-ethylpentanediamine, 3-methylpentanediamine or 3-ethylpentanediamine. 2-Methylpentane-1,5-diamine is particularly preferred.

In a particularly preferred embodiment of the present invention, the diamine ($B_2$) is an isomer mixture of two or more primary diamines of 6 carbon atoms, e.g. 2-methylpentanediamine and 2-ethylbutanediamine, which may also contain hexamethylenediamine in amounts of as much as 20, preferably 5, % by weight.

($B_3$) The diamines ($B_2$) are used alone, but are preferably employed in combination with diaminodiamides ($B_3$), as obtained by condensation of 2 moles of the same diamines ($B_2$) with 1 mole of any dicarboxylic acid having a molecular weight of from 118 to 1000, preferably from 146 to 600. Examples of suitable dicarboxylic acids are adipic acid, azelaic acid, sebacic acid and dimeric fatty acids, the latter being preferred.

The mixtures of the diamines ($B_2$) and the diaminodiamides ($B_3$) are preferably obtained in situ, i.e. the condensation reaction between the dicarboxylic acid and the diamine ($B_2$) is carried out in the presence of an excess of the latter.

In particular cases, it may also be advantageous to react the diaminodiamide ($B_3$) alone with the ketone ($B_1$) to give the diketimine (B).

(C) Secondary amines which may or may not be used concomitantly may be any nonaromatic amines, for example dialkylamines, such as dimethylamine, diethylamine, dipropylamine or dibutylamine. However, alkanolamines, e.g. methylethanolamine, ethylethanolamine, diethanolamine, methylisopropanolamine, ethylisopropanolamine or diisopropanolamine, are preferred. Other useful secondary amines (C) are those which also possess an additional tertiary amino group e.g. N,N-diethyl-N'-isobutylpropylene-1,3-diamine or N,N-bis-(2-hydroxyethyl)-N'-isobutylpropylene-1,3-diamine.

It may sometimes be advantageous additionally to use a ketimine of a primary monoamine as component (C). In particular, ketimines of long-chain primary monoamines, e.g. octylamine, laurylamine or stearylamine, or amidoamines obtained from primary diamines and monocarboxylic acids, such as ethylhexanoic acid or higher fatty acids, can be used for plasticizing the coatings produced from the novel synthetic resins.

Where ketimines of amidoamines, obtained from primary diamines and monocarboxylic acids, are additionally used as component (C), preferred diamines in turn are the compounds ($B_2$) stated above. In these cases, the preparation of the mono-fatty acid amine can be carried out, for example, simultaneously with the formation of the diaminodiamide ($B_3$) if the relevant monocarboxylic acid is added to the mixture of diamine ($B_2$) and dicarboxylic acid prior to the condensation reaction.

Finally, it is also possible to use monoketimines of the primary/tertiary diamines as component (C). Examples of these are the ketimines of N,N-diethylethylenediamine and of N,N-diethylpropylene-1,3-diamine. These amines are more readily obtainable than the abovementioned secondary/tertiary diamines, and, via their ketimines, it is possible to incorporate additional basic groups into the resins.

The ratios of the components (A), (B) and, where relevant, (C) can be varied within wide limits. For most intended uses according to the invention, it is desirable to prepare epoxide-free synthetic resins, i.e. the number of epoxide equivalents of epoxy resin (A) used is preferably from 50 to 100% of the sum of the number of ketimine and secondary amine equivalents of components (B) and (C) employed. In the case of products which do not contain any component (C), the molecular weight of the novel synthetic resin is regulated by the ratio of the number of equivalents of epoxide groups to the number of equivalents of the ketimine groups. In this case, the number of epoxide equivalents of epoxy resin (A) which are employed is particularly preferably from 50 to 75% of the number of ketimine equivalents of component (B) used. If component (C) is additionally employed, the achievable molecular weight is furthermore restricted by the amount of monofunctional component (C). This also makes it possible to choose the sum of the number of equivalents of (B) and (C) employed to be equal to the number of equivalents of (A).

The mean molecular weights $\overline{M}_n$ of the novel synthetic resins should be about 1000–10,000; for many purposes, for example for the preparation of aqueous cathodic coating systems, mean molecular weights $\overline{M}_n$ of from 1500 to about 5,000 are desirable.

The reaction of components (A), (B) and, where relevant, (C) is advantageously carried out in the presence of a solvent, for example a hydrocarbon, such as toluene or xylene, a ketone, such as methyl ethyl ketone or methyl isobutyl ketone, an alcohol, such as ethanol or butanol, an ester, an ether or the like, at from 50° to 150° C., preferably from 80° to 130° C.

After treatment with water, the novel synthetic resin contains hydroxyl groups, secondary amino groups and also primary and/or tertiary amino groups. It can therefore undergo a large number of crosslinking reactions, which, after admixing suitable crosslinking agents, makes it a useful binder for surface coatings.

Examples of suitable crosslinking agents for the novel binder are aminoplast resins, such as urea/formaldehyde resins, melamine resins or benzoguanamine resins, phenoplast resins, blocked isocyanate crosslinking agents, crosslinking agents which are curable via ester aminolysis and/or transesterification and possess on average two or more active ester groups per molecule, e.g. β-hydroxyalkyl ester crosslinking agents according to European Pat. No. 40,867, and carbalkoxymethyl ester crosslinking agents according to German Patent Application No. P 32 33 139.8, urea condensates, as obtained, for example, from primary di- and/or polyamines, secondary monoamines and urea, in the presence or absence of a polyalcohol, e.g. trimethylolpropane, and β-hydroxyalkyl carbamate crosslinking agents as obtained by, for example, reacting polyprimary amines with ethylene carbonate. The amounts of crosslinking agents used depend on the type and number of groups, in the synthetic resin and crosslinking agent, which react with one another, and on the crosslinking density desired. The weight ratio of synthetic resin to crosslinking agent is in general from 1:9 to 9:1, preferably from 1:1 to 9:1, in particular from 1.5:1 to 4:1.

It is not absolutely necessary to use separate crosslinking agents since crosslinking functions can also be incorporated into the novel synthetic resin, making it self-crosslinking. This can be done, for example, by a procedure in which the resin obtained after the reaction of (A), (B) and, where relevant, (C) is reacted with a partially blocked polyisocyanate which still contains on average about one free isocyanate group in the molecule. Examples of suitable blocking agents are alcohols, phenols and oximes. Another possible method of modifying the novel synthetic resin to render it self-crosslinking comprises introducing β-hydroxyalkyl carbamate groups. To do this, the ketone is first eliminated hydrolytically from the resin according to the invention. The resulting primary amino groups are then converted to β-hydroxyethyl carbamates, for example with ethylene carbonate.

In addition to crosslinking agents, other substances, such as pigments, assistants, solvents and curing catalysts, may be added. The coating materials prepared in this manner can be applied onto substrates such as wood, plastic or metal by a conventional method, such as spraying, submersion, casting or knife coating. Depending on the type of crosslinking agent, curing of the coatings takes place at from 120° to 210° C. in the course of about 5–40 minutes, the lowest baking temperature requiring the longest baking time.

The amine numbers of the novel synthetic resins are in general from about 50 to 300 mg of KOH per g. These resins, if appropriate also as a mixture with the above crosslinking agents, can therefore be converted to aqueous dispersions by protonation of some or all of the amino groups, the said dispersions advantageously being used for the electrocoating of electrically conductive substrates, e.g. metal articles. For this purpose, a neutralizing agent, e.g. formic acid, acetic acid, lactic acid or phosphoric acid, is stirred in, and the mixture is diluted with water to the processing concentration.

For cathodic electrocoating, the solids content of the electrocoating bath is generally brought to 5–30% by weight. Deposition is usually carried at from 15° to 40° C. for from 0.5 to 5 minutes and at a pH of from 4.0 to 8.5, preferably from 5.0 to 7.5, in general at a deposition voltage of from 50 to 500 volt. The electrically conductive article being coated is made the cathode. The film deposited is cured at above 120° C. for about 20 minutes.

The Examples which follow illustrate the invention without restricting it.

In the Examples, parts and percentages are by weight.

I. Preparation of the diketimines of the primary diamines Intermediate 1:

In a vessel provided with a water separator, 348 parts of 2-methylpentanediamine and 960 parts of methyl isobutyl ketone are refluxed with separation of water until 108 parts of water have been removed. The product has an amine number of 267 mg of KOH per g and a solvent content of 30%.

Intermediate 2:

In a vessel provided with a water separator and a packed column, an isomer mixture consisting of 821 parts of 2-methylpentanediamine, 102 parts of 2-ethylbutanediamine and 5 parts of hexamethylenediamine is reacted with 1740 parts of a dimeric fatty acid, 280 parts of a fatty acid obtained from linseed oil and 222 parts of xylene for from 3 to 4 hours at from 160° to 180° C. During the reaction, about 120 parts of water and about 220 of xylene are distilled off. The resulting product has an amine number of 179 mg of KOH per g. 2091 parts of methyl isobutyl ketone are then added, and the mixture is refluxed with removal of 162 parts of water.

Excess methyl isobutyl ketone is substantially removed by distillation under from 100 to 200 mbar from the resulting diketimine solution, which is about 75% strength. The concentrated diketimine solution has an amine number of 133 mg of KOH per g and still contains about 6% of solvent.

Intermediate 3:

316 parts of a commercial isomer mixture of 2,2,4- and 2,4,4-trimethylhexanediamine are reacted with 290 parts of a dimeric fatty acid in 50 parts of xylene as described for Intermediate 2. About 18 parts of water and 50 parts of xylene are distilled off in the course of from 3 to 4 hours. The product has an amine number of 286 mg of KOH per g. Thereafter 657 parts of methyl isobutyl ketone are added, and the mixture is refluxed with removal of about 54 parts of water. The product has an amine number of 141 mg of KOH per g and contains 30% of solvent.

Intermediate 4:

Intermediate 4 serves as a starting material for comparative example 2. It is prepared using a branched diamine as component (B$_2$) in contrast to the process according to the invention:

821 parts of hexamethylenediamine, 1740 parts of a dimeric fatty acid, 280 parts of a fatty acid obtained from linseed oil and 222 parts of xylene are reacted for from 3 to 4 hours at from 160° to 180° C., as described for Intermediate 2. During the reaction, about 120 parts of water and about 220 parts of xylene are distilled off. The product has an amine number of 179 mg of KOH per g. Thereafter, 2091 parts of methyl isobutyl ketone are added, and the mixture is refluxed with removal of 162 parts of water. Excess methyl isobutyl ketone is substantially removed, by distillation under from 100 to 200 mbar, from the resulting diketimine solution, which is about 75% strength. The concentrated diketimine solution has an amine number of 133 mg of KOH per g and still contains about 6% of solvent.

II. Preparation of the novel synthetic resin carrying basic nitrogen groups

EXAMPLE 1

The traces of water present are removed, using a water separator, from 217 parts of a diglycidyl ether obtained from 2,2-bis-(4-hydroxyphenyl)-propane and epichlorohydrin, having an epoxide equivalent weight of 190 and 60 parts of toluene. Thereafter, 285.7 parts of Intermediate 1 are added, and the mixture is kept at 120° C. for 20 hours. After a short time, epoxide groups are no longer detectable. When methyl isobutyl ketone has been eliminated hydrolytically, the product contains 3.3% of basic nitrogen, including 0.7% of primary nitrogen, 2.4% of secondary nitrogen and 0.2% of tertiary nitrogen.

COMPARATIVE EXAMPLE 1

This Example is similar to Example 1, except that, instead of the ketimine of 2-methylpentanediamine the free amine itself is used.

152 parts of the diglycidyl ether used in Example 1, dissolved in 50 parts of xylene, are added dropwise to 50 parts of 2-methylpentanediamine at 80° C. while cooling, and the temperature is kept at 80° C. by cooling. The viscosity of the product increases, and the mixture gels after about 80% of the intended amount has been fed in.

EXAMPLE 2

207.9 parts of a diglycidyl ether obtained from 2,2-bis-(4-hydroxyphenyl)-propane and epichlorohydrin and having an equivalent weight of 485 and 54.3 parts of a similar diglycidyl ether having an equivalent weight of 190 are refluxed together with 60 parts of toluene in order to remove any traces of water present. Thereafter, 231.8 parts of Intermediate 3 and 22.5 parts of diethanolamine are added, and the mixture is heated at 120° C. After 5 hours, epoxide is no longer detectable. The product is diluted with 12 parts of butylglycol and 50 parts of isobutanol, and has a solids content of 70% This corresponds to a solids content of 62.5% after hydrolytic elimination of methyl isobutyl ketone.

EXAMPLE 3

258.7 parts of diglycidyl ether obtained from 2,2-bis-(4-hydroxyphenyl)-propane and epichlorohydrin and having an equivalent weight of 485 are dissolved in 65 parts of toluene, and the traces of water present are removed using a separator. 154.6 parts of Intermediate 2 and 22.7 parts of diethanolamine are added, and the mixture is heated at 120° C. After 3 hours, epoxide is no longer detectable. The product is then diluted with 12.7 parts of butylglycol and 95.9 parts of isobutanol to a theoretical solids content of 70%; this corresponds to 65.1% after hydrolytic elimination of methyl isobutyl ketone.

COMPARATIVE EXAMPLE 2

This Example is similar to Example 3, except that, instead of Intermediate 2, the Intermediate 4 obtained from the straight-chain hexamethylenediamine is used.

After standing for several days, the resin assumes a gel-like consistency and is no longer capable of flow at room temperature.

III. Use of the novel synthetic resin in heat-curable coating materials, in particular in cathodic electrocoating finishes In order to be able to carry out crosslinking at elevated temperatures, crosslinking agents have to be mixed with the synthetic resin carrying basic nitrogen groups, the resin forming stable mixtures with these crosslinking agents at room temperature and undergoing crosslinking when heated.

Crosslinking agent 1:

A blocked isocyanate crosslinking agent (polyurethane crosslinking agent) is prepared as described in German Laid-Open Application DOS No. 2,701,002, Example 1, by adding 218 parts of 3-ethylhexanol slowly to 291 parts of an 80/20 isomer mixture of 2,4- and 2,6-toluene diisocyanate in a nitrogen atomosphere while stirring, the reaction temperature being kept below 38° C. by external cooling. The mixture is kept at 38° C. for a further half hour and then heated to 60° C., after which 75 parts of trimethylolpropane are added, followed by 0.08 part of dibutyl tin dilaurate as a catalyst. After an initial exothermic reaction, the mixture is kept at 121° C. until essentially all the isocyanate groups have been consumed; this takes 1.5 hours and is detectable from the infrared spectrum. The mixture is then diluted with 249 parts of ethylene glycol monoethyl ether.

Crosslinking agent 2:

A polyester crosslinking agent is prepared as described in European Pat. No. 40,867, Example 2d), the procedure being as follows: 192 parts of trimellitic anhydride and 500 parts of glycidyl versatate, having an epoxide equivalent weight of 250, are mixed, and the stirred mixture is heated at 100° C. An exothermic reaction occurs, and the temperature increases to 190° C. The mixture is cooled to 140° C., after which 2 parts of benzyldimethylamine are added. The mixture is kept at 140° C. for 3 hours, a viscous, clear product being formed.

Crosslinking agent 3:

A urea condensate which is a suitable crosslinking agent is prepared as follows:

58 parts of hexamethylenediamine, 60.1 parts of 3,3-dimethyl-4,4-diaminodicyclohexylmethane and 90 parts During this procedure, ammonia is eliminated above about 120° C. The reaction mixture is initially liquid and then solidifies to a white crystalline mass. The temperature is increased, until a clear melt is formed at 180° C. At this temperature, 193.5 parts of dibutylamine are added in the course of 8 hours and, when the addition is complete, the mixture is kept at from 180° to 190° C. until refluxing no longer occurs; this requires about 4 hours. After cooling, the urea condensate solidifies to colorless, glassy material having a softening point of about 100° C.

Crosslinking agent 4:

Another urea condensate which is a suitable crosslinking agent is prepared as follows:

134 parts of trimethylolpropane, 366 parts of urea and 1548 parts of di-n-butylamine are heated together at 140° C. until the initial vigorous evolution of ammonia has substantially abated, this requiring about 1 hour. The temperature is then increased to 160° C., after which 348 parts of 2-methylpentanediamine are added dropwise in the course of 1 hour while the internal temperature is slowly increased to 190°–200° C. After the reaction has continued for 8 hours at 200° C., the mixture is cooled to 130° C., 2 parts of dibutyl tin dilaurate are added, and 1110 parts of di-n-butylamine are distilled off while increasing the internal temperature stepwise to 175° C. The residue is diluted with 270 parts of methyl isobutyl ketone to a solids content of about 80%.

EXAMPLE 4

42.6 parts of the crosslinking agent 1, 2 parts of dibutyl tin dilaurate and 2.3 parts of acetic acid are added to 117 parts of the synthetic resin described in Example 2.

EXAMPLE 5

51 parts of the crosslinking agent 4 are added to 147 parts of the synthetic resin described in Example 3, and the mixture is stirred. After the addition of 3.15 parts of acetic acid, the product becomes water-dilutable.

EXAMPLE 6

42.6 parts of the crosslinking agent 3 are added to 125 parts of the synthetic resin described in Example 3, and the mixture is stirred. After the addition of 2.5 parts of acetic acid, the product becomes water-dilutable.

EXAMPLE 7

108 parts of the synthetic resin described in Example 3, 30 parts of the crosslinking agent 2, 3 parts of lead octoate (24% Pb) and 2.5 parts of acetic acid are mixed at room temperature.

COMPARATIVE EXAMPLE 3

This Example is similar to Example 6. Instead of the synthetic resin described in Example 3, the same amount of the synthetic resin based on straight-chain hexamethylenediamine, as described in Comparative Example 2, is used.

IV. Testing of the binders

For testing as cationic electrocoating finishes, 10% strength dispersions are prepared from the binders mixed with acid by adding demineralized water. 90 parts of a pigment paste prepared as described below are added in each case to 1000 parts of the particular binder dispersion.

Pigment paste

A paste binder is first prepared. To do this, 393 parts of a diglycidyl ether obtained from 2,2-bis(4-hydroxyphenyl)-propane and epichlorohydrin and having an equivalent weight of 485 are dissolved in 99 parts of xylene, and the traces of water present are removed by means of a separator. 393 parts of Intermediate 2 are added at 120° C. After the reaction has continued for 3 hours at this temperature, epoxide is no longer detectable. The product is then diluted to a theoretical solids content of 64.5% with 298 parts of butyl glycol. This corresponds to 60% after hydrolytic elimination of methyl isobutyl ketone. Finally, the paste binder is brought to a water-dilutable form by neutralization with 22.5 parts of acetic acid.

317 parts of this paste binder, 63 parts of butyl glycol, 532 parts of water, 389 parts of kaolin, 78 parts of basic lead silicate, 52 parts of carbon black, 13 parts of rutile and 1500 parts of glass beads having a diameter of 2 mm are stirred at a speed of 1000 rpm for 45 minutes in a stirredball mill. After the glass beads have been separated off, a black paste having a solids content of 50.6% is obtained.

The baths are stirred for 48 hours at 30° C. Coating films are deposited in the course of 2 minutes at the stated voltage on zinc-phosphatized steel test panels which have been made the cathode, and the resulting films are baked for 20 minutes at 180° C. or 160° C. Thereafter, the resistance to acetone is checked by rubbing back and forth 50 times with an acetone-impregnated cottonwool ball, the flexibility is tested by the reverse impact test, and the resistance to salt spray mist is checked. The Table below shows the results.

TABLE

| Surface coating according to | pH | Throwing power Ford method (voltage) | Resistance to acetone (baking temperature) | Reverse impact | Exposure to salt spray mist for 500 hours according to ASTM (underpenetration at the scratch) | Bath stability |
|---|---|---|---|---|---|---|
| Example 4 | 7.4 | 20 cm (300 V) | 1 (180° C.) | 160 in × lb (= 1.84 m.kg) | 0.5 mm | Satisfactory |
| Example 5 | 6.7 | 21 cm (330 V) | 1 (160° C.) | 160 in × lb (= 1.84 m.kg) | 0.5 mm | Satisfactory |
| Example 6 | 7.2 | 22 cm (290 V) | 1 (160° C.) | 160 in × lb (= 1.84 m.kg) | 0.5 mm | Satisfactory |
| Example 7 | 7.0 | 21 cm (320 V) | 2 (180° C.) | 160 in × lb (= 1.84 m.kg) | 1 mm | Satisfactory |
| Comparative Example 3 | 7.2 | 22 cm (310 V) | 1 (160 C.) | 160 in × lb (= 1.84 m.kg) | 0.5 mm | Forms a border; small amount of sediment |

Resistance to acetone:
1 = very good
6 = inadequate
The films deposited from baths according to Comparative Example 3 and then baked show a more pronounced orange peel structure than similar novel finishes according to Example 6.

We claim:

1. A synthetic resin which carries basic nitrogen groups, is obtainable by reacting (A) one or more epoxy resins having a mean molecular weight $\overline{M}_n$ of from 300 to 6000 and on average from 1.5 to 3.0 epoxide groups per molecule with (B) a diketimine of a diprimary amine and, if required, (C) with a secondary amine, which may or may not additionally contain a tertiary amino group, with a ketimine of a primary monoamine or with a ketimine of a primary/tertiary diamine, with a mixture of a secondary amine and a ketimine of a primary monoamine, with a mixture of a secondary amine and a ketimine of a primary/tertiary diamine, with a mixture of a ketimine of a primary monoamine and a ketimine of a primary/tertiary diamine or with a mixture of a secondary amine, a ketimine of a primary monoamine and a ketimine of a primary/tertiary diamine, and is water-dilutable after protonation with an acid, wherein component (B) is a diketimine obtained from ($B_1$) a ketone and ($B_2$) one or more branched aliphatic diprimary diamines of 5 to 9 carbon atoms, which, if required, may be replaced with up to 20 per cent by weight of other aliphatic, araliphatic or cycloaliphatic diprimary diamines, and some or all of the diamine (B2) may be replaced with ($B_3$) one or more diaminodiamides which are obtainable by condensation of 2 moles of a diamine (B2) and 1 mole of a dicarboxylic acid having a molecular weight of from 118 to 1000.

2. A synthetic resin as claimed in claim 1, wherein the primary amino groups of the diamine (B2) of 5 to 9 carbon atoms are separated by a branched divalent aliphatic radical which has an odd number of carbon atoms in the main chain.

3. A synthetic resin as claimed in claim 1, wherein the diamine (B2) of 5 to 9 carbon atoms is 2-methylpentane-1,5-diamine.

4. A synthetic resin as claimed in claim 1, wherein the diamine (B2) of 5 to 9 carbon atoms is an isomer mixture of two or more diprimary diamines of 6 carbon atoms, which mixture may furthermore contain as much as 20% by weight of hexamethylenediamine.

5. A synthetic resin as claimed in claim 1, wherein some or all of the hydroxyl groups of the reaction product of (A), (B) and, where relevant, (C) are converted to urethane groups with partially blocked polyisocyanate.

6. A process for the preparation of a synthetic resin as claimed in claim 1, wherein the number of epoxide equivalents of epoxy resin (A) which are employed is from 50 to 100% of the sum of the number of ketimine and secondary amine equivalents of components (B) and (C).

7. A process for the preparation of a synthetic resin as claimed in claim 1, wherein a glycidyl ether of a polyphenol which has on average two or more phenolic hydroxyl groups per molecule and a mean molecular weight $\overline{M}_n$ of from 350 to 5000 is used as epoxy resin (A).

8. A process for the preparation of a synthetic resin as claimed in claim 1, wherein methyl isobutyl ketone is used as ketone ($B_1$).

9. A process for the preparation of a coating material, wherein a synthetic resin as claimed in claim 1, rendered water-dilutable by protonation with an acid and in the form of an aqueous dispersion, which may or may not additionally contain crosslinking agents, organic solvents, pigments and/or further assistants, is employed.

10. A coating material which contains a synthetic resin as claimed in claim 1, which carries basic nitrogen groups and is water-dilutable on protonation with an acid, as the binder and additionally contains a crosslinking agent.

11. A coating agent as claimed in claim 10, wherein the crosslinking agent is an aminoplast resin and/or a phenoplast resin.

12. A coating material as claimed in claim 10, wherein the crosslinking agent is a blocked polyvalent isocyanate.

13. A coating material as claimed in claim 10, wherein the crosslinking agent is a compound which is capable of undergoing ester aminolysis and/or transesterification and has on average two or more activated ester groups per molecule.

14. A coating material as claimed in claim 10, wherein the crosslinking agent is a urea condensate which is obtained by reacting primary di- or polyamine or a mixture of a primary diamine and a primary polyamine with urea and a secondary monoamine in the presence or absence of a polyalcohol at elevated temperatures, with removal of the ammonia formed.

15. An article provided with a surface coating, wherein the coating is obtained by applying a synthetic resin as claimed in claim 1 and carrying out baking.

16. An article provided with a surface coating, wherein the coating is obtained by applying a coating material as defined in claim 10 and carrying out baking.

17. An article provided with a surface coating, wherein the coating is obtained by applying a coating material as defined in claim 11 and carrying out baking.

18. An article provided with a surface coating, wherein the coating is obtained by applying a coating material as defined in claim 13 and carrying out baking.

* * * * *

UNITED STATES PATENT AND TRADEMARK OFFICE
CERTIFICATE OF CORRECTION

PATENT NO. : 4,699,937
DATED : Oct. 13, 1987
INVENTOR(S) : Loch et al.

It is certified that error appears in the above-identified patent and that said Letters Patent are hereby corrected as shown below: On the title page After "[22] Filed: Dec. 12, 1985" insert -- [30] Foreign Application Priority Data Dec. 4, 1984, [DE] Fed.Rep.of Germany .. 3444110 --

[57] ABSTRACT, line 6 "which" should be -- with --

Signed and Sealed this

Twenty-sixth Day of April, 1988

Attest:

DONALD J. QUIGG

*Attesting Officer*  *Commissioner of Patents and Trademarks*